US006660197B1

(12) United States Patent
Buch-Rasmussen et al.

(10) Patent No.: US 6,660,197 B1
(45) Date of Patent: Dec. 9, 2003

(54) METHOD FOR PRODUCING AN ELONGATED DRUG FORMATION

(75) Inventors: Thomas Buch-Rasmussen, Gentofte (DK); Søren Aasmul, Holte (DK); James M. Flink, Klampenborg (DK); Philip Hansen, Holte (DK); Claus Juul-Mortensen, Frederiksberg (DK); Jens-Ulrik Poulsen, Virum (DK)

(73) Assignee: Novo Nordisk A/S, Bagsvaerd (DK)

( * ) Notice: Subject to any disclaimer, the term of this patent is extended or adjusted under 35 U.S.C. 154(b) by 286 days.

(21) Appl. No.: 09/689,189

(22) Filed: Oct. 12, 2000

(51) Int. Cl.[7] .......................... B29B 11/12; B29B 11/14

(52) U.S. Cl. ........................ 264/120; 264/109; 264/123

(58) Field of Search .......................... 264/297.6, 297.1, 264/109, 123, 125, 120; 425/237, 294, 362

(56) References Cited

U.S. PATENT DOCUMENTS

| | | | | |
|---|---|---|---|---|
| 4,776,998 | A | | 10/1988 | Davidson et al. |
| 4,818,450 | A | | 4/1989 | Hall et al. |
| 4,822,271 | A | | 4/1989 | Annicchiarico et al. |
| 5,039,294 | A | | 8/1991 | Gautier et al. |
| 5,422,160 | A | | 6/1995 | Ratko et al. |
| 5,456,917 | A | | 10/1995 | Wise et al. |
| 5,556,633 | A | | 9/1996 | Haddad et al. |
| 5,595,589 | A | | 1/1997 | Hoshiba et al. |
| 5,595,700 | A | | 1/1997 | Kitazawa |
| 5,762,961 | A | | 6/1998 | Roser et al. |
| 5,801,215 | A | | 9/1998 | Odashima |
| 6,277,311 | B1 | * | 8/2001 | Eimer et al. ................ 264/117 |
| 6,391,338 | B1 | * | 5/2002 | Frisbee et al. .............. 424/487 |

FOREIGN PATENT DOCUMENTS

| | | | |
|---|---|---|---|
| DE | OS 2 055 147 | 5/1972 | |
| DE | OS 2 122 526 | 11/1972 | |
| DE | 26 05 099 | 9/1976 | |
| DE | OS 20 485 | 11/1977 | |
| DE | OS 3 049 276 | 10/1981 | |
| DE | OS 3 129 130 | 5/1982 | |
| DE | OS 3 202 219 | 8/1983 | |
| DE | OS 3 605 734 | 8/1987 | |
| EP | 049 068 | 7/1982 | |
| EP | 197 777 | 10/1986 | |
| EP | 236 529 | 9/1987 | |
| EP | 391 497 | 10/1990 | |
| EP | 0 935 958 A1 | 2/1998 | ............. A61J/3/07 |
| SE | 8002585 | 5/1984 | |
| WO | WO 92/13633 | 8/1992 | |
| WO | WO 93/18878 | 9/1993 | |
| WO | WO 95/17153 | 12/1994 | ............. A61J/3/07 |
| WO | WO 95/09079 | 4/1995 | |
| WO | WO 95/09080 | 4/1995 | |
| WO | WO 95/10407 | 4/1995 | |

* cited by examiner

*Primary Examiner*—Stephen J. Lechert, Jr.
(74) *Attorney, Agent, or Firm*—Reza Green, Esq.; Richard W. Bork, Esq.; Marc A. Began, Esq.

(57) ABSTRACT

The present invention relates to a method and a system for producing an elongated drug formulation being suitable for being injected through the skin of a patient with-out the use of a needle or a cannula. The drug formulation is produced by compressing a drug granulate in cavity of a system comprising a roller and a surface, wherein the roller roles over the surface thereby comprising the granulate to the formulation.

36 Claims, 2 Drawing Sheets

METHOD FOR PRODUCING AN ELONGATED DRUG FORMATION

The present invention relates to a method and a system for producing an elongated drug formulation, in particular an elongated drug formulation having sufficient strength for being injected through the skin of the patient without the use of a needle or cannula.

BACKGROUND

Some drugs are administered parenterally, either because a rapid effect is desired, or because due to the nature of the drug it will be destroyed in the stomach before any effect of the drug has occurred.

By far the most widely used method for parenteral injection of drugs is by injection of an aqueous solution using a hypodermic syringe. The use of aqueous solutions is associated with a number of inherent problems. In order to inject a given volume of drug, a much larger volume of water and different additives also have to be injected, leading to injection of a high volume. In particular for muscular injection the pain associated with injection is primarily caused by the volume injected, not by the penetration of the skin. Any reduction in volume would thus lead to a reduction in pain for the patient.

Injection of drugs as solid particles have been discussed in the prior art, such as powder injection and injection of drug formulations having the shape of needles, the latter being administerable with greater precision than the powders.

WO 96/08289 (Societe de conseils de recherches et d'application scientifiques S.A) discloses a medicament having the shape of one end of a toothpick. Its dimensions range from 1 mm to 3 cm in length. The medicament has a crush strength of 8 millipoise and is described to be prepared using conventional techniques such as compression, thermofusion, or extrusion without specifically discussing any of the techniques.

Macroneedles for injection are also disclosed in WO 96/03978 (Quadrant Holdings Cambridge Ltd). These needles are of the dimension 0.1 to 4 mm in diameter and 1 to 30 mm in length. The needles comprise a glassy vehicle and an effective amount of at least one guest substance and are prepared by extrusion.

To obtain a satisfactory solid-dose-parenteral-injection, the drug formulation to be injected must be of small volume to avoid injection pain and to achieve a desired dissolution rate. Also, the drug formulation should be provided with a well-defined strength to make it possible to penetrate the cutis of the patient, be it an animal or human being. Furthermore, the drug formulation should be long-term stable at ambient temperature in terms of both strength and structure of the drug formulation and the biological activity of the drug. The pre-determined strength may be provided by using a carrier in addition to the drug to be administered. A carrier used to provide the necessary strength should comprise compounds that are tissue compatible and that are contained in the pharmacopoeia.

Compression of a granulate consisting of active compounds and optionally vehicle substances is known from tablet pressing, whereby the granulate is metered in a cavity and subsequently compressed by entering a plunger into the cavity. Tablets are mostly pressed in the form of cylinders of relatively short length as compared to the diameter of the cylinder. The strength of the tablet is not crucial with respect to the functionality thereof since the tablet is often swallowed to be disintegrated by the body fluids and enzymes in the stomach and guts.

In order to compress the drug formulations to be parenterally injected it has been found that the usual method of tablet pressing is not applicable, possibly due to the small dimensions of the drug formulation whereby the metering process for filling the matrices is impaired. Furthermore, it may not be possible to obtain the relevant strength by the use of conventional compression technology.

SUMMARY OF THE INVENTION

Accordingly, it has been an object of the present invention to provide a method for producing an elongated drug formulation for parenteral administration.

This is achieved by the present method for producing an elongated drug formulation comprising

- arranging a first roller adjacent a surface, whereby a cavity is defined between the first roller and the surface, the shape of the drug formulation being defined by the cavity,
- feeding a gap between the first roller and the surface with drug granulate,
- rolling the roller against the surface whereby a pressure is applied to the drug granulate and the drug formulation is formed in the cavity,
- disengaging the first roller from the surface, and
- releasing the compressed drug formulation from the cavity.

The term "elongated" is used in its usual meaning, i.e. that the length dimension is larger than the width or diameter of the drug formulation.

Furthermore, the invention relates to a system for producing an elongated drug formulation comprising a first roller arranged adjacent a surface, defining a cavity is defined between the first roller and the surface, means for feeding a gap between the first roller and the surface with drug granulate, means for rolling the roller against the surface compressing a drug formulation in the cavity, means for disengaging the first roller from the surface, and means for releasing the compressed drug formulation from the pocket cavity.

DRAWINGS

DETAILED DESCRIPTION OF THE INVENTION

Figure 1:
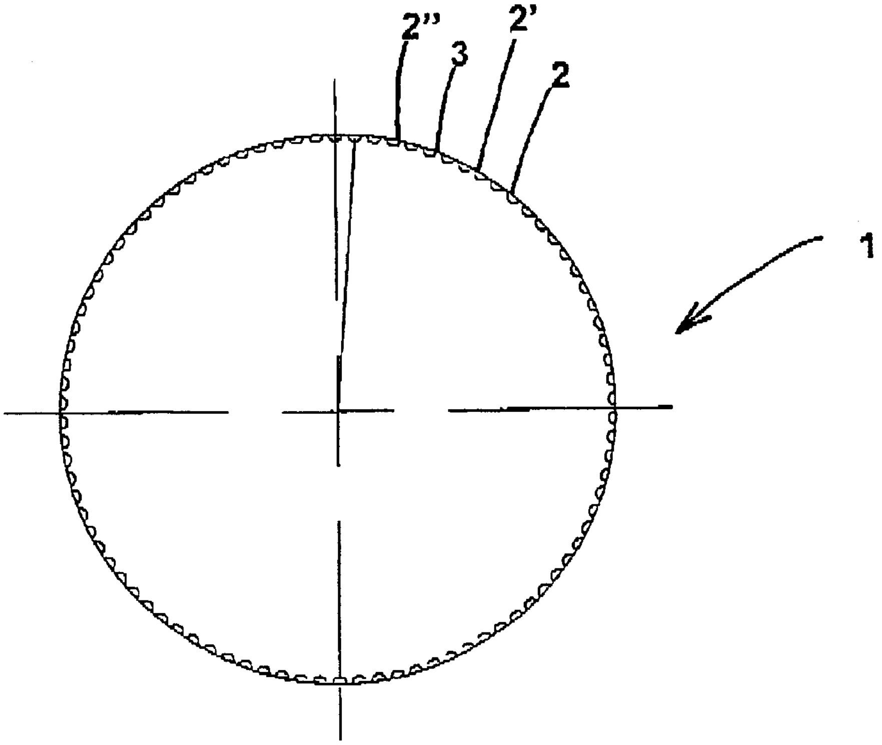
FIG. 1 is a schematic drawing of a roller with cavities along the circumference.

The present invention relates to a method for producing an elongated drug formulation as well as a system herefor.

Cavity

The drug formulation is produced in a cavity defined by a first roller and a surface. The cavity defined between the first roller and the surface may be in either the roller or the surface. In either cases the shape of the drug formulation is defined by the cavity when the roller is rolled over the surface. Although using the term "over the surface", there is no intention in limiting the invention to a roller rolling over a horizontal surface. The roller and the surface may be in any position in relation to each other the only requirement being that the roller is adjacent the surface so that the cavity is at least substantially closed by the roller in order to apply a pressure to the drug granulate therein.

The cavity may have any suitable shape as long as the length of the cavity is larger than the width or diameter of the cavity. Furthermore, the cavity must be easily relieved of the drug formulation after compression. The cross section of the cavity may have any suitable shape, such as half circular or V-shaped. Thereby, the drug formulation will assume the same cross section after compression. The axis of the elongated cavity is preferably perpendicular to the rolling direction of the roller, in order to obtain the maximum pressure force applied to the drug granulate in the cavity.

In one embodiment the cavity is a pocket cavity arranged in the roller. It is to be understood that the term cavity means at least one cavity and preferably several cavities in the circumference of the roller. Thus, the roller may be provided with several pocket cavities around the circumference of the roller, whereby several drug formulations are produced by rolling the roller one full turn. In a preferred embodiment the roller is rolled over a hard surface with a layer of drug granulate. By rolling the roller across the surface the drug granulate is compressed by the pressure applied to the drug granulate between the roller and the surface thus forming the drug formulation in the cavity.

The pocket cavities may be formed as recesses in the roller. It is however within the scope of the present invention, that the pocket cavity(ies) is(are) arranged individually in a projecting part on the roller.

In another embodiment at least one cavity is arranged in the surface, more preferably several cavities are arranged in the surface. Thereby the drug formulations are produced by applying a metered layer of drug granulate on the surface and into the cavities, and then activating the roller to roll across the surface compressing the drug granulate into the drug formulations.

The cavity may also be defined by a pocket cavity of the first roller and a sub-cavity of the surface. Thereby, the drug formulation is defined by the sum of the two cavities and it is possible to obtain a more refined shaped of the drug formulation. By the use of two cavities for producing one drug formulation it is possible to design how much of the drug formulation to be defined by each cavity. In particular, the amount of drug formulation defined by either the sub-cavity and the pocket cavity depends on the predetermined shape of the drug formulation it is however also of importance with respect to the mode of releasing the drug formulation from the cavities.

By forming one cavity to define a larger part of the drug formulation it is possible that the drug formulation will remain therein after disengaging of the roller from the surface. In particular in case the larger part is formed in the roller it is possible to release the drug formulation to a conveying belt, for example, positioned away from the surface, thereby facilitating the transportation of the drug formulation. accordingly, in one embodiment of the invention it is preferred that the inner shape of the pocket cavity defines more than half of the outer shape of the drug formulation.

However, the shape of the specific drug formulation to be produced will sometimes require that the inner shape of the sub-cavity is substantially identical to the inner shape of the pocket cavity. Thereby it has become possible to produce substantially circular or oval drug formulations. Thus, by the use of two cavities the elongated drug formulation may assume the form of a rod having a substantially circular cross-section.

Another preferred shape are rods having a cross section which is substantially triangular, square, or polygonal.

The movement of the roller and the surface in relation to each other may be arranged as suitable in the specific system. The surface may be stationary whereby the roller is performing an axial movement parallel to the surface in addition to the rotating movement of the roller. In another embodiment the roller is fixed only allowing rotating movements of the roller, and the surface may then be moving, such as when the surface is part of a conveying belt. Any suitable combination of these two variations are of course also possible.

The conveying belt is preferably comprising sub-cavities as defined above, either directly in the conveying belt, or by at least two conveying parts defining the sub cavity in combination. The drug granulate may then be applied to the surface before the surface is being passed by the roller Double Roll Presses In another preferred embodiment the surface described above is the circumference or the surface of a second roller, whereby the first roller and the second roller function as double roll presses. The double roll presses achieve compression by squeezing the granulate between two counter-currently rotating rollers wherein at least one of the rollers is having a cavity.

Compressing Pressure

Gap—Feeding

The predetermined strength of the drug formulation is obtained by combining the pressure applied with a sufficient amount of suitable drug granulate for the specific cavity.

The pressure applied to the drug formulation is preferably in the range of 25–5000 kg/cm$^2$, more preferably in the range of 100–1000 kg/cm$^2$, whereby a drug formulation having the required strength and stability is obtainable.

Metering of the drug formulation to ensure a sufficient amount to be compressed for each cavity may be done by any suitable means with respect to the small dimensions of the cavities in question. Preferably the cavity as well as the space above and surrounding the cavity is filled with drug formulation before compression. The metering itself may be performed by a cutting off mechanism on the roller, or may be performed by a partitioning tool dividing the drug formulation into metered dosages before compression.

The gap between the roller and the surface is preferably continuously fed with drug granulate. The feeding may be conducted in any suitable manner. In one embodiment the gap is fed by means of a feeding system comprising a screw feeder whereby the drug granulate may be pre-compressed. The screw feeders or force feeders may be arranged as a vertical straight or lightly tapered screw feeder, and inclined straight screw feeder, a vertical tapered screw feeder or a horizontal screw feeder. The arrangement of the screw feeder is mostly depending on the arrangement of the roller in relation to the surface.

In case of a horizontal surface to be adjacent to a roller a screw feeder may be arranged almost parallel with the surface feeding the gap. By the use of a substantially vertical screw feeder gravity is part of the pre-compression forces applied to the drug granulate. Thus, the feed mechanism is characterized by the pressure caused by gravity or a force feed system and the friction between material and roller surface.

In another embodiment the gap is filled by simply applying a layer of drug granulate on the surface before rolling the roller. A stopper mechanism to inhibit displacement of the drug granulate may then be provided.

The gap between the roller and the surface is largely depending on the size of the roller. The larger the gap the more drug granulate may be filled into the cavity before compression thereby increasing the density of the compressed formulation leading to production of drug formulations of a higher strength.

Feeding Pressure

As described above a pressure may be applied to the drug granulate before feeding, such as by a pre-compression of the granulate. However, it is more preferred to apply a pressure during feeding of the drug granulate. The pressure may be applied by means of the screw feeder or by means of a pressure piston.

In one embodiment the drug granulate is pressurised to a rod before feeding the gap. Thereby the rod is partitioned into smaller fragments fitting the gap between the roller and the surface either by means of a cutting mechanism or simply by projections on the roller itself. Such projections may be part of the cavity as described above.

Continuous—Stepwise Production

The method of producing the drug formulation is preferably carried out as a continuous method, wherein the steps of feeding and compression is continuously alternating. The roller is preferably continuously rolling over the surface.

However, is may be convenient that the alternating steps of feeding and compression are carried out stepwise, in a manner whereby the feeding step is performed while the roller is at stand still followed by the rolling and compression step.

Whether a continuous or a stepwise performance is selected the compression forces is preferably kept for a predetermined standing time for each cavity, such as preferably a standing time in the range of between 1 msec and 50 seconds per cavity, more preferred 5 msec—5 sec per cavity.

Drug Granulate

The flowability of the drug granulate is an important feature in order to obtain a drug formulation of the predetermined strength. Thus, the drug granulate is preferably granulated to powder, wherein the average diameter of the granules is in the range of 10–250 $\mu$m, preferably in the range of 20–150 $\mu$m, more preferably 25–100 $\mu$m. Furthermore, the ratio of the average diameter of the drug granulate to the diameter of the cross section of the drug formulation is preferably at the most 1:2, more preferably at the most 1:4 for the granulate to be distributed evenly in the cavity before and during compression. In particular for the production of pointed drug formulations it is important the granulate is distributed evenly into the part of the cavity shaping the pointed end.

Preferentially, the drug formulation should be essentially free from entrapped air. It is very important for the strength of the drug formulation that only very little air is entrapped inside the drug formulation during processing in order to prevent air in the drug formulation after compression. Apart from reducing the strength, entrapped air also takes up unnecessary space and thereby reduces the amount of active ingredients contained in the formulation.

Too much air entrapped in the drug granulates leads to a less sufficient compression of the granulate which again leads to decreased strength of the drug formulation, and it is therefore an object of the invention to feed the gap with high density drug granulate. The density of the uncompressed drug granulate is preferably in the range of 0.1–1.6 g/cm$^3$, such as in the range of 0.4–0.8 g/cm$^3$. Increasing the density of the drug granulate may be carried out by using vacuum or by pre-compression of the drug granulate as described above.

By using granulate of the mentioned density the compression will preferably lead to an increase in density from granulate to drug formulation so that the density of the compressed drug formulation is at least 2 times the density of the uncompressed drug granulate, preferably at least 2,5 times, and more preferably even higher.

The drug granulate is composed of the active component of the drug as well as any binders and other additives. The additives and the optional binder may be co-granulated with the drug, or they may be mixed homogeneously as powders. An advantage of this embodiment is that the active component and the additives can be mixed in an essentially dry state where both ingredients are in the shape of a powder.

Drug Dimensions

When referring herein to preferred dimensions of the drug formulation the diameter of the substantially circular rod is used as a measure for the cross section area. For the triangular or otherwise formed rods the cross section area is correlated to the diameter of a corresponding circular rod. The diameter of the elongated drug formulation is preferably in the range of 0.2 to 1.0 mm, such as more preferred in the range of 0.3 to 0.7, even more preferred in the range of 0.4 to 0.6 mm. The diameter of the drug formulation is important with respect to the pain associated with the injection of the formulation, the smaller diameter the better. However, in order to obtain a sufficient amount of drug in the formulation to be injected, it is important that the diameter is not too small. By providing the drug formulation with this thickness, it has been determined that it can be injected essentially without pain. A further advantage is that less force is required to penetrate the skin as the diameter is reduced. By needles formed of the drug formulation according to the invention, it has been found that even at these dimensions they still have the necessary strength to penetrate the cutis or mucosa upon injection. A further advantage of using small diameters is that the surface area to volume ratio is higher than for larger diameters. Thereby the drug formulations are dissolved more rapidly and the drugs can enter the body fluids to exert their effect. However, a too small diameter will require a very long drug formulation in order to contain the predetermined amount of therapeutic agent. A too small diameter would also reduce the compressive strength of the drug formulation and maybe cause it to break upon injection.

Accordingly, the ratio of the length of the elongated drug formulation to the diameter of the elongated drug formulation is preferably between 100:1 and 3:1, such as more preferably between 20:1 and 5:1, and the length of the elongated drug formulation is preferably in the range of 1–20 mm, more preferably 2–10 mm. A too long formulation increases the risk of imparting some unpleasant feeling to the person to be injected in the period until the formulation has disintegrated because the long formulation may be felt projecting into the skin from sub-cutis.

In practice the length of the drug formulation is largely determined by the dose of the therapeutic agent, the amount of binder, and the selected diameter. The dose of many therapeutic proteins is approximately 1 mg. One mg of protein excluding binder corresponds approximately to a cylinder with a diameter of 0.5 mm and a length of 3 mm. If such a drug formulation containing 1 mg of protein is made from 50% therapeutic agent and 50% binder, the drug formulation has a length of 6 mm. When the required dose is smaller, the dimension of the drug formulation will be reduced accordingly. A dose of ⅓ mg protein in a drug formulation with 50% binder having a diameter of 0.5 mm has an approximate length of 2 mm. The invention is not restricted to any specific volume, the volume being determined by the length and diameter of the drug formulation. In most cases, the volume of the drug formulation is less than 5 $\mu$l, preferably less than 1 $\mu$l. Volumes down to 0.25 $\mu$l can obtained for small doses of therapeutic agent. Thus, the above-mentioned drug formulation having a diameter of 0.5 mm and a length of 2 mm has a volume of 0.39 $\mu$l.

Cavity Arrangement

In order to provide an industrially applicable method it is preferred that the first roller comprises several pocket cavities. Accordingly, the first roller according to the invention comprises at least two pocket cavities, such as preferably more than 10 cavities. The number of pocket cavities is depending on the inter-cavity distance as well as the circumference of the roller. In order to optimise the production it is preferred that the shortest distance between the center of two adjacent cavities corresponds to at least the diameter of the drug formulation, preferably at least 1.2 times the diameter of the drug formulation. Thereby, any cartridge belt formation is avoided. By the term cartridge belt formation is meant the phenomena that two drug formulations produced in neighbor cavities are connected by a flat layer of compressed drug formulation. It is preferred that the distance between the center of two adjacent cavities corresponds to from 2 to 6 degrees of the roller circumference, preferably approximately 4 degrees, whereby 90 pocket cavities may be arranged in the roller.

The size of the roller is adapted primarily to the size of the drug formulation produced. It is preferred the diameter of the roller is at least 1 cm, more preferred at least 4 cm.

The roller may be made of any material suitable with respect to the pressure forces mentioned. In particular steel, such as hardened steel, or a ceramic may be suitable. The temperature of the roller, surface and cavities will for most embodiments be room temperature. However, to enhance the compression it may be convenient to use a different temperature of the cavity. Thus, in one embodiment the cavity is heated to above room temperature during production of a drug formulation.

To enhance the release step of the drug formulation the cavity may be heated during compression and subsequently cooled during production of a drug formulation.

Pointed End

Although the drug formulation itself has a very small cross section, it has been shown that the pain associated with injection of the drug formulation decreases when the drug formulation comprises a pointed end.

As a human skin model, porcine abdomen skin has been used in penetration tests. Graphite rods with differently shaped pointed ends are pressed into porcine skin with a Lloyd Instrument LR5K, UK. The pressure force is measured in Newton as a function of the distance. The maximum force is used to compare the different rod shapes. No point (180°) on the rod is unsatisfactory and the rod breaks before entering the skin. Using a graphite rod with a cone shaped point (90° top angle) is sufficient to penetrate the skin. However, a top angle of 60° significantly improves the penetration of the skin. Points with an angle below 30° are very thin and thereby fragile.

Accordingly, the pointed end tapers preferably into an acute angle, wherein the angle is less than 90°, preferably less than 75°, more preferably less than 60°. The pointed end may assume any configuration depending of the shape of the drug formulation itself, thus for a substantially circular drug formulation the pointed end may have the shape of a cone, whereas a drug formulation having a square cross section has a pyramid-formed pointed end, in a more preferred embodiment the top angle of the pointed end should be between 30 and 110°, preferably between 40 and 90°, more preferably between 50 and 70°.

The drug formulation may be defined by a cylindric part and a pointed-end part. In this case another way of defining the pointed end is the reduction of the diameter from the beginning of the pointed-end part, i.e. towards the cylindrical part of the formulation, to the most tapered end of the pointed end. It is preferred that the diameter is reduced by at least 30%, such as at least 40%. Independent of the reduction it is preferred that the pointed end is rounded.

The pointed end is the most delicate part of the drug formulation during compression and in particular during release of the drug formulation after compression. It is of great importance that the pointed end is not destroyed during de-moulding and later transport and storage. In a system using a pocket cavity and a sub-cavity in the surface, the pointed end is preferably shaped in a manner whereby a part of the inner shape of the pocket cavity defines more than half of the outer shape of the pointed end of the drug formulation.

Release—Disengagement

When the pressure has been applied to the drug granulate in the cavity the roller must be disengaged from the surface. The roller is preferably disengaged by continuously moving the roller in relation to the surface whereby the cavity is opened and the compressed drug formulation may be released from the cavity.

During release it must be secured that no disintegration of the compressed drug formulation, in particular of the pointed end, is happening.

The drug formulation may be released from the cavity be means of gravity itself by designing the roller and surface therefor. It is however preferred that the release is controlled, such as by means of vacuum release or by an expelling means.

The expelling means is preferably an expeller positioned in the cavity. The expeller may be positioned in the centre of the cavity, i.e. the middle part of the cavity, or the expeller may be positioned in one end of the cavity. In the latter case the expeller is preferably positioned in the end of the formulation having the pointed end.

Independent of release form the drug formulation may be transported directly to a packaging means when released from the cavity. This is particular relevant when the drug formulation is released by means of expelling, whereby the drug formulation may be expelled into the packaging.

In a further embodiment a continuous band is lining each cavity, whereby the release of the drug formulation may be conducted by the release of the continuous band from the cavity after compression. In a preferred embodiment the continuous band is part of the packaging for the drug formulation. This is particular relevant when both a cavity and a sub-cavity is lined by a continuous band which after compression may form an upper and lower part of the packaging.

Strength

By the term strength is meant that the drug formulation has sufficient compressive strength to penetrate the skin of a patient it has been determined experimentally that a pressure force of at least approx. 0,7 Newton is required to penetrate the epidermis of a human being with the claimed drug formulation. Less is required to penetrate the mucosa. Consequently, the drug formulation must be able to withstand such pressure force.

The strength can be tested in a force gauge tester such as an Advanced Force Gauge AFG-250N from Mecmesin, UK. Tests are carried out by formulating the drug formulation as a rod and applying a pressure force to the rod. The pressure force is increased until the rod breaks. The instrument records the pressure force necessary to break the rod. This parameter is termed the compressive strength and should be understood as the breaking strength under compression.

The strength obtained for the drug formulation must be maintained for a time period sufficient for transport, storage and sale until use of the drug formulation. Thus, at least 95% of the strength of the drug formulation should be maintained after 6 months, preferably after 12 months, at ambient temperature. It is important that the drug formulations are long term stable not only with respect to the biological activity and the structure of the drug formulation, but also that the strength is essentially unaffected by storage.

By this embodiment it is obtained that the drug formulation acts like a needle and can penetrate the cutis or mucosa of the patient in the same way as a hypodermic needle to enter the subcutis or submucosa. Thereby less force is required to force the drug formulation through the cutis or mucosa and less binder is required to obtain the necessary strength.

According to an especially preferred embodiment, the drug formulation has the shape of a rod essentially cylindrical and pointed at one end as defined above.

Drug Formulations

Any type of therapeutic agent can be incorporated into the drug formulation and the invention is not limited to drugs with any specific function. Thus the therapeutic agent may be selected from analgesics, antianxiety drugs, antiarthiritic drugs, antibiotic agents, anticholinergics, antidepressants, antidiabetics, antiemetics, antihistaminics, antihypertensive agents, antiinflammatory drugs, antimigraine agents, antiparkinsonism agents, antipasmodesics, antipsychotics, antithrombotic agents, antiviral agents, appetite suppressants, blood factors, cardiovascular drugs, cerebral vasodilators, chemotherapeutic drugs, cholinergic agonists, contraceptives, coronary agents, diuretics, growth factors, hormonal agents, immunosuppressive agents, narcotic antagonists, opiods, peripheral asodilators, tranquilizers, vaccines, immunogenic agents, and immunising agents.

Similarly, the therapeutic agent may be any type of compound such as steroids, hormones, lipids, nucleic acids, nucleotides, oligonucleotides, oligosaccharides, organics, antibodies, peptide mimetics, peptides, polypeptides, polysaccharides, and proteins. In particular the therapeutic agent may be a peptide, a polypeptide or a protein. Actually, the drug formulation may also contain subcellular drug formulations, cells, bacteria or vira as a therapeutic agent for immunogenic purposes.

Important is that the therapeutic agent is homogeneously distributed throughout the drug formulation so that its release is initiated as soon as the drug formulation starts dissolving.

According to a preferred embodiment, the therapeutic agent is selected from hormones, antidiabetic drugs, growth factors, and blood factors. Preferably, the therapeutic agent is a protein selected from the group insulin, glucagon, growth hormone, growth factors, blood factors such as FVII or FVIII, GLP-1, EPO, TPO, interferon or derivatives of these proteins. Such proteins can either be naturally occurring proteins or recombinant proteins.

The drug formulation may be produced from the therapeutic agent alone, it will however be appropriate to include a binder in the formulation. Any suitable binder may be used, provided it is acceptable for parenteral use, such as binders in the European Pharmacopeia, the Japanese Pharmacopela and/or the US Pharmacopeia. Examples of the binders are: Carboxymethylcellulose (CMC), Fructose, Glucose, Sucrose, Sorbitol, Maltose, Hydroxypropyl-Cellulose, Lactose, D-Mannitol, MCC, HPC (Hydroxypropylcellulose, Na-phosphates, K-phosphates, Ca-phosphates, Na-carbonates and Caoarbonates.

Apart from the binder and the therapeutic agent, the drug formulation may comprise additives, which could be selected from but is not restricted to the group of preservatives, stabilisers, adjuvants, lubricants, and disintegratets. Some therapeutic agents may need to be preserved or stabilised through the use of a preservative or stabiliser, although this is likely to be necessary only in a few cases, owing to the almost anhydrous conditions in the drug formulation. In the cases where the therapeutic agent is for immunisation, it may be preferential to add an adjuvant to increase the immunogenic response. Lubricants such as fatty acids or their salts may be added to ensure that the drug formulation does not stick to its packaging, e.g. a cartridge, and/or to provide lubrication as the drug formulation penetrates the skin. Lubricants may be stearates, such as Mg-stearates, Zn-stearates or Ca-stearates. In cases where a rapid release of the therapeutic agent is desired and in cases where the therapeutic agent comprises a large proportion of the drug formulation it may be necessary to add disintegrators which will cause the drug formulation to disintegrate and thereby release the therapeutic agent rapidly.

Also the drug formulation may comprise stabilizers, such as alanine, histidine and glycine.

Furthermore, the drug formulation may be provided with a coating after compression. Such a coating could for instance comprise a lubricant as mentioned above and the purpose could for instance be to reduce the friction during penetration of the epidermis and thereby reduce the injection pain.

There are several advantages connected with using a solid pharmaceutical drug formulation according to the invention for parenteral injection. Through avoidance of needles, one source for cross contamination in hospitals is eliminated. The injection volume according to the invention is very small, it can be less than 5 μl, preferably from 1 to 2 μl. Therefore, the drug formulation can be injected essentially without pain.

In addition, the therapeutic agent of the drug formulation according to the invention is long term stable even at ambient temperature and there is no need for special storage conditions such as refrigeration. Furthermore, the drug formulation is stable at ambient temperature both in terms of the compressive strength, the glassy nature of the binder and the geometry.

The drug formulation can preferably be used for patients requiring frequent medication such as diabetics. By frequent is meant that the therapeutic agent must be injected parenterally at least once a day. Such patients always need to carry with them a quantity of therapeutic agent for injection. The convenience of administration as well as the convenience of storage of the drug formulations according to the present invention makes it especially useful for this group of patients.

Another preferred use of the drug formulation is for immunisation. Immunisation of children is often carried out in the clinics of general practitioners that will appreciate the less rigid storage requirements of the drug formulations according to the inventions. The same cartridge containing several drug formulations can be used for different children, since there is no risk for cross contamination. The only object that penetrates the skin of the patient is the drug formulation itself. The injection will not cause the injection device or the cartridge housing the drug formulations to be contaminated. Additionally, children who often suffer from pre-injection fear will appreciate the almost painless injection that can be carried out.

Another large group of patients requiring immunisation is in the tropics and during epidemics where large groups of individuals need immunisation at essentially the same time. Using the drug formulations according to the present invention for mass immunisations is much more rapid and much safer than using conventional injection of aqueous solutions or suspensions of the immunoactive agent According to the prior art, a new hypodermic needle needs to be used for every single person.

Mass medication is also frequently used in animal and fish farming. In these cases it will also be of great advantage to use the drug formulations according to the present invention for reasons of speed and reduction of cross contamination.

The system is now described in detail in relation to the drawings.

FIG. 1 shows a first roller 1 according to the invention. A plurality of cavities 2 are arranged in the circumference of the roller 1. The distance between two neighboring cavities 2', 2" is denoted 3. In FIG. 1 the cavities 2 are arranged evenly along the circumference, i.e. the distance 3 is the same for all neighboring cavities 2.

Figure 2:
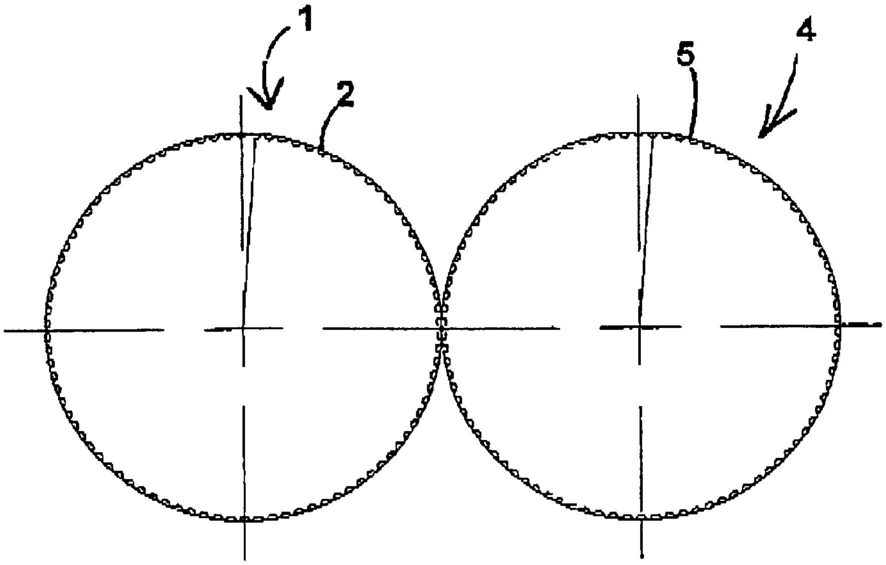
FIG. 2 is a schematic drawing of a double-roll press system having two counter-currently rolling rollers with cavities designed as recesses in the circumference of the rollers.

FIG. 2 is a schematic view of a double role press system according to the invention comprising a first roller 1 and a second roller 4. First roller 1 is as discussed with respect to FIG. 1. The second roller 4 comprises sub-cavities 5. The two roller are arranged so that when counter rolling the two cavities each cavity 2 will make a sub-cavity 5 whereby it is possible to produce a drug formulation defined by the sum of cavity 2 and sub-cavity 5. In the present example cavity 2 and sub-cavity 5 are of identical shape and size, however as explained above, this need not to be the case for all systems.

Figure 3:
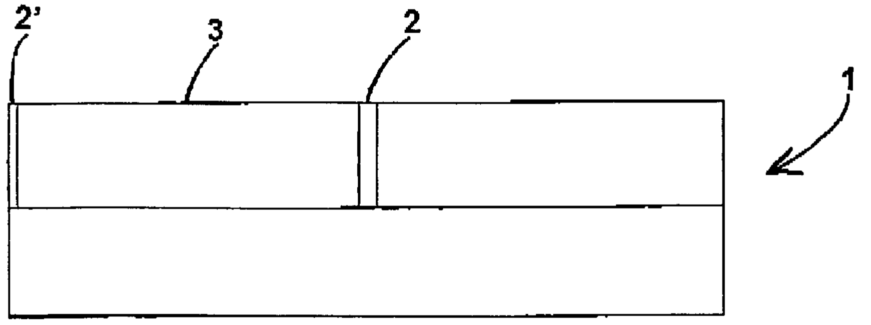
FIG. 3 is a schematic drawing of a roller with a cavity.

FIG. 3 is a schematic view of the first roller 1 the cavity 2,2' is seen from above. In wherein this view the elongated shape of the cavity 2 is shown. The distance between two neighboring cavities 2,2' is shown as 3.

Figure 4:
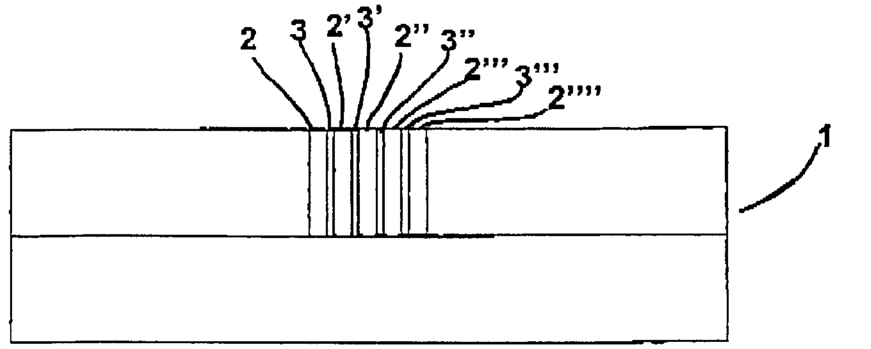
FIG. 4 is a schematic drawing of one roller seen from above having several cavities for an elongated drug formulation.

In FIG. 4 a first roller, 1 comparable to that of FIG. 3 is depicted, the difference being that the distance 3 is much smaller that FIG. 3.

Figure 5:
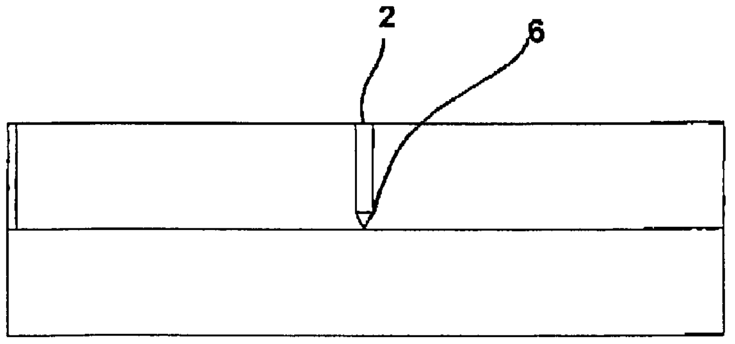
FIG. 5 is a schematic drawing of another roller seen from above exemplifying a cavity for an elongated drug formulation with a pointed end.
Figure 6:
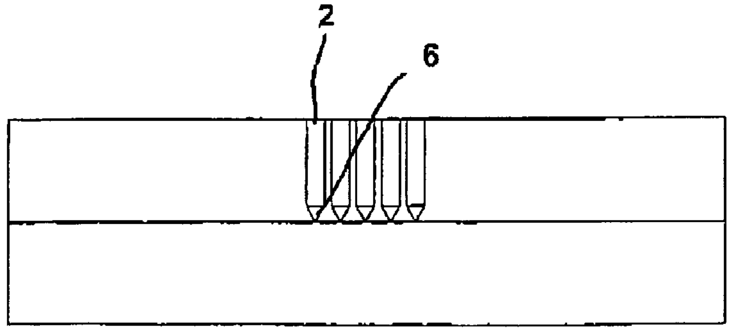
FIG. 6 is a schematic drawing of one roller seen from above having several cavities for an elongated drug formulation with a pointed end.

In FIG. 5 and FIG. 6 a schematic view as in FIG. 3 and FIG. 4 is shown except that in FIG. 5 and FIG. 6 the cavity 2 tapers into a pointed end 6.

What is claimed is:

1. A method for producing an elongated drug formulation comprising

- arranging a first roller adjacent a surface, whereby a cavity is defined between the first roller and the surface, the shape of the drug formulation being defined by the cavity,
- feeding a gap between the first roller and the surface with drug granulate,
- rolling the roller against the surface whereby a pressure is applied to the drug granulate and the drug formulation is formed in the cavity,
- disengaging the first roller from the surface, and
- releasing the compressed drug formulation from the pocket cavity;
- wherein pressure applied to the drug granulate is in the range of 25–5000 $kg/cm^2$ and the density of the uncompressed drug, granulate is in the range of 0.1–1.6 $g/cm^3$.

2. The method according to claim 1, wherein the cavity is a pocket cavity arranged in the first roller.

3. The method according to claim 2, wherein the pocket cavity is arranged in a projecting part on the first roller.

4. The method according to claim 3, wherein the surface comprises at least one sub-cavity, the shape of the drug formulation being defined by the pocket cavity and the sub-cavity.

5. The method according to claim 2, wherein the surface comprises at least one sub-cavity, the shape of the drug formulation being defined by the pocket cavity and the sub-cavity.

6. The method according to claim 5, wherein a part of the inner shape of pocket cavity defines more than half of the outer shape of the pointed end of the drug formulation.

7. The method according to claim 1, wherein the surface is the surface of a second roller, whereby the first roller and the second roller function as double roll presses.

8. The method according to claim 1, wherein the first roller comprises at least two pocket cavities.

9. A method for producing an elongated drug formulation comprising:

- arranging a first roller adjacent a surface, whereby a cavity is defined between the first roller and the surface, the shape of the drub formulation beings defined by the cavity,
- feeding a gap between the first roller and the surface with drug granulate,
- rolling the roller against the surface whereby a pressure is applied to the drug granulate and the drug formulation is formed in the cavity,
- disengaging the first roller from the surface, and
- releasing the compressed drug formulation from the pocket cavity, wherein the elongated drug formulation has a substantially circular cross section, the diameter of said formulation being in the range of 0.2–1.0 mm.

10. A method for producing an elongated drug formulation comprising

- arranging a first roller adjacent a surface, whereby a cavity is defined between the first roller and the surface, the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein the ratio of the average diameter of the drug granulate to the diameter of the cross section of the drug formulation is at the most 1:2.

11. A method for producing an elongated drug formulation comprising arranging a first roller adjacent a surface, whereby a cavity is defined between the first roller and the surface, the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein the average diameter of the drug granulate is in the range of 10–250 micrometers.

12. A method for producing an elongated drug formulation comprising arranging a first roller adjacent a surface, whereby a cavity is defined between the first roller and the surface, the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein the density of the compressed drug formulation is at least 2 times the density of the uncompressed drug granulate.

13. A method for producing an elongated drug formulation comprising arranging a first roller adjacent a surface, whereby a cavity is defined between the first roller and the surface, the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein the ratio of the length of the elongated drug formulation to the diameter of the elongated drug formulation is between 100.1 and 3:1.

14. A method for producing an elongated drug formulation comprising arranging a first roller adjacent a surface, whereby a cavity is defined between the first roller and the surface, the shape of the drug formulation being defined by the cavity, feeding a rap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein the length of the elongated drug formulation is in the range of 1–20 mm.

15. A method for producing an elongated drug formulation comprising arranging a first roller adjacent a surface, whereby a cavity is defined between the first roller and the surface, the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein the elongated drug formulation comprises a pointed end.

16. A method for producing an elongated drug formulation comprising arranging a first roller adjacent a surface, whereby a cavity is defined between the first roller and the surface, the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein the pointed end tapers in an angle less than 90 degrees.

17. The method according to claim 16, wherein the diameter is reduced by at least 30% from one end to the other of the pointed end.

18. A method for producing an elongated drug formulation comprising arranging a first roller adjacent a surface, whereby a cavity is defined between the first roller and the surface, the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket, wherein the cavity is a pocket cavity arranged in the first roller, wherein the inner shape of the sub-cavity is substantially identical to the inner shape of the pocket cavity.

19. A method for producing an elongated drug formulation comprising arranging a first roller adjacent a surface, whereby a cavity is defined between the first roller and the surface, the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket, wherein the cavity is a pocket cavity arranged in the first roller, wherein the inner shape of the pocket cavity defines more than half of the outer shape of the drug formulation.

20. A method for producing an elongated drug formulation comprising arranging a first roller adjacent a surface, whereby a cavity is defined between the first roller and the surface, the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein the cavity is a pocket cavity arranged in the first roller, and wherein the surface is part of a conveying belt.

21. A method for producing an elongated drug formulation comprising arranging a first roller adjacent a surface, whereby a cavity is defined between the first roller and the surface, the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein a pressure is applied to the drug granulate before feeding.

22. The method according to claim 21, wherein the pressure is applied by means of a screw feeder or a pressure piston.

23. The method according to claim 21, wherein the drug granulate is pressurised to a rod before feeding the gap.

24. A method for producing an elongated drug formulation comprising arranging a first roller adjacent a surface, whereby a cavity is defined between the first roller and the surface, the shape of the drug formulation being defined by the cavity, feeding a cap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein a pressure is applied to the drug granulate during feeding.

25. The method according to claim 24, wherein the pressure is applied by means of a screw feeder or a pressure piston.

26. A method for producing an elongated drug formulation comprising arranging a first roller adjacent a surface, whereby a cavity is defined between the first roller and the surface, the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein the first roller is rolled continuously against the surface.

27. A method for producing an elongated drug formulation comprising arranging a first roller adjacent a surface, whereby a cavity is defined between the first roller and the surface, the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein the first roller is rolled stepwise, whereby a feeding step is followed by a rolling/compression step.

28. A method for producing an elongated drug formulation comprising arranging a first roller adjacent a surface, whereby a cavity is defined between the first roller and the surface, the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein the compressed drug formulation is released by means of vacuum suction.

29. A method for producing an elongated drug formulation comprising arranging a first roller adjacent a surface, whereby a cavity is defined between the first roller and the surface, the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein an expeller is arranged in the pocket cavity for releasing the compressed drug formulation from the cavity.

30. The method according to claim 29, wherein the expeller is centered in the cavity.

31. The method according to claim 29, wherein the expeller is arranged in one end of the cavity.

32. A method for producing an elongated drug formulation comprising arranging a first roller adjacent a surface, whereby a cavity is defined between the first roller and the surface, the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein the compressed drug formulation is released by means of a continuous band lining each pocket cavity or sub-cavity.

33. A method for producing an elongated drug formulation comprising arranging a first roller adjacent a surface, whereby a cavity is defined between the first roller and the surface the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein the first roller comprises at least two pocket cavities, and wherein the shortest distance between the center of two adjacent cavities corresponds to at least the diameter of the drug formulation.

34. A method for producing an elongated drug formulation comprising arranging a first roller adjacent a surface, whereby a cavity is defined between the first roller and the surface, the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein the diameter of the first roller is at least 1 cm.

35. A method for producing an elongated drug formulation comprising arranging a first roller adjacent a surface, whereby a cavity is defined between the first roller and the surface, the shape of the drug formulation being defined by the cavity, feeding a gap between the first roller and the surface with drug granulate, rolling the roller against the surface whereby a pressure is applied to the drug granulate and the drug formulation is formed in the cavity, disengaging the first roller from the surface, and releasing the compressed drug formulation from the pocket cavity, wherein the cavity is heated to above room temperature during production of a drug formulation.

36. The method according to claim 35, wherein the cavity is heated and subsequently cooled during production of a drug formulation.

* * * * *